(12) United States Patent
Lonnberg

(10) Patent No.: US 11,954,255 B2
(45) Date of Patent: Apr. 9, 2024

(54) HAPTIC EFFECT DEVICE

(71) Applicant: Aito BV, Amsterdam (NL)

(72) Inventor: Jockum Lonnberg, Amsterdam (NL)

(73) Assignee: Aito BV, Amsterdam (NL)

( * ) Notice: Subject to any disclaimer, the term of this patent is extended or adjusted under 35 U.S.C. 154(b) by 86 days.

(21) Appl. No.: 17/792,627

(22) PCT Filed: Jan. 14, 2021

(86) PCT No.: PCT/EP2021/050653
§ 371 (c)(1),
(2) Date: Jul. 13, 2022

(87) PCT Pub. No.: WO2021/144345
PCT Pub. Date: Jul. 22, 2021

(65) Prior Publication Data
US 2023/0040966 A1    Feb. 9, 2023

(30) Foreign Application Priority Data

Jan. 14, 2020  (FI) .................................... 20205029

(51) Int. Cl.
*G06F 3/01* (2006.01)
*G01L 1/16* (2006.01)
*G06F 3/041* (2006.01)

(52) U.S. Cl.
CPC ............... *G06F 3/016* (2013.01); *G01L 1/16* (2013.01); *G06F 3/04144* (2019.05)

(58) Field of Classification Search
CPC ...... G06F 3/016; G06F 3/04144; G06F 3/041; G01L 1/16; H03K 17/964
See application file for complete search history.

(56) References Cited

U.S. PATENT DOCUMENTS 6,294,878 B1 * 9/2001 Murata .............. H05B 41/2822
                                                    315/276
8,686,952 B2 * 4/2014 Burrough ................ G06F 3/041
                                                    345/169

(Continued)

FOREIGN PATENT DOCUMENTS

| EP | 0472888 | 3/1992 |
| WO | 2019068540 | 4/2019 |
| WO | 2021144345 | 7/2021 |

OTHER PUBLICATIONS

"Finland Application No. 20205029 Search Report", dated Aug. 6, 2020, 2 pages.

(Continued)

*Primary Examiner* — Curtis J King
(74) *Attorney, Agent, or Firm* — DeLizio, Peacock, Lewin, & Guerra LLP

(57) ABSTRACT

A device comprises a substrate layer having a first side and a second side. The second side of the substrate layer comprises at least one depression. The device comprises a touch-interface surface on the first side of the substrate layer. The device comprises at least one piezoelectric transducer on the second side of the substrate layer comprising a support plate and a piezoelectric element. The at least one piezoelectric transducer is aligned with the at least one depression of the substrate layer. The device comprises a printed circuit board layer electrically coupled to the piezoelectric element of the piezoelectric transducer. A device and a trackpad are provided.

15 Claims, 7 Drawing Sheets

(56) References Cited

U.S. PATENT DOCUMENTS

| | | | |
|---|---|---|---|
| 9,398,359 B2* | 7/2016 | Lee | G06F 1/1601 |
| 9,448,631 B2* | 9/2016 | Winter | G06F 3/03547 |
| 9,854,078 B2* | 12/2017 | Lee | H04M 1/035 |
| 10,222,889 B2* | 3/2019 | Picciotto | G06F 3/0488 |
| 10,416,799 B2* | 9/2019 | Picciotto | G06F 3/0488 |
| 10,860,112 B1* | 12/2020 | Knoppert | G06F 3/044 |
| 11,067,269 B1* | 7/2021 | Hrehor, Jr. | F21V 23/005 |
| 11,079,816 B1* | 8/2021 | North | H10N 30/03 |
| 11,119,598 B2* | 9/2021 | Laitinen | H10N 30/875 |
| 11,380,470 B2* | 7/2022 | Amin-Shahidi | G06F 3/016 |
| 11,809,631 B2* | 11/2023 | Chen | G06F 3/016 |
| 2009/0008234 A1* | 1/2009 | Tolbert | H01H 13/702 |
| | | | 200/600 |
| 2010/0182263 A1* | 7/2010 | Aunio | G06F 3/0414 |
| | | | 345/173 |
| 2011/0148608 A1* | 6/2011 | Grant | G06F 1/1626 |
| | | | 345/173 |
| 2012/0229401 A1* | 9/2012 | Birnbaum | G06F 3/016 |
| | | | 345/173 |
| 2012/0274599 A1 | 11/2012 | Schediwy | |
| 2012/0306785 A1* | 12/2012 | Chien | G06F 3/03547 |
| | | | 345/173 |
| 2013/0002093 A1* | 1/2013 | Kim | H03H 9/17 |
| | | | 310/324 |
| 2013/0033967 A1* | 2/2013 | Chuang | H10N 35/00 |
| | | | 367/140 |
| 2013/0120306 A1* | 5/2013 | Furukawa | G06F 3/041 |
| | | | 345/173 |
| 2013/0335211 A1* | 12/2013 | Kobayashi | H04M 1/0266 |
| | | | 340/407.2 |
| 2014/0028153 A1* | 1/2014 | Smirnov | F04B 43/046 |
| | | | 310/328 |
| 2014/0160040 A1* | 6/2014 | Kang | H04R 17/005 |
| | | | 345/173 |
| 2014/0306914 A1* | 10/2014 | Kagayama | G06F 3/03547 |
| | | | 345/173 |
| 2015/0185963 A1* | 7/2015 | Lee | H04R 17/005 |
| | | | 345/177 |
| 2016/0197609 A1 | 7/2016 | Van Der Neut | |
| 2016/0373110 A1* | 12/2016 | Koehne | F21V 23/04 |
| 2017/0153703 A1* | 6/2017 | Yun | G06F 3/016 |
| 2017/0279034 A1 | 9/2017 | Matsuzawa et al. | |
| 2019/0107902 A1* | 4/2019 | Kao | G06F 3/043 |
| 2019/0302948 A1* | 10/2019 | Laitinen | G06F 3/016 |
| 2020/0306797 A1* | 10/2020 | Lönnberg | B06B 1/0651 |
| 2021/0141456 A1* | 5/2021 | Neuwirth | G06F 3/016 |
| 2021/0240267 A1* | 8/2021 | Gajiwala | G06F 3/0219 |

OTHER PUBLICATIONS

"PCT Application No. PCTEP2021050653 International Preliminary Report on Patentability", dated Apr. 20, 2022, 14 pages.

"PCT Application No. PCTEP2021050653 International Search Report and Written Opinion", dated May 4, 2021, 9 pages.

* cited by examiner

HAPTIC EFFECT DEVICE

TECHNICAL FIELD

The present disclosure relates to an electronic device, and more particularly to an electronic device for sensing and/or for providing a haptic effect.

BACKGROUND

Haptic effects, provided by for example haptic effect elements, such as piezoelectric transducers, can be utilized in providing a tactile sensation to a user in various applications. For example, in a touch-based user interfaces, such as in a laptop trackpad, a clicking sensation may be provided to a user without the touched surface moving significantly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide an electronic device for sensing and/or for providing a haptic effect. The foregoing and other objects are achieved by the features of the independent claims. Further implementation forms are apparent from the dependent claims, the description and the figures.

According to a first aspect, a device comprises: a substrate layer having a first side and a second side, wherein the second side of the substrate layer comprises at least one depression; a touch-interface surface on the first side of the substrate layer; at least one piezoelectric transducer on the second side of the substrate layer comprising a support plate and a piezoelectric element, wherein the at least one piezoelectric transducer is aligned with the at least one depression of the substrate layer; and a printed circuit board, PCB, layer electrically coupled to the piezoelectric element of the piezoelectric transducer. The device may, for example, be thinner since the depression can be implemented in the substrate layer.

In an implementation form of the first aspect, the device further comprises a touch-interface layer having a first side and a second side, wherein the substrate layer is positioned on the second side of the touch-interface layer and the first side of the substrate layer faces the touch-interface layer and the touch interface surface is on the first side of the touch-interface layer. The device may, for example, be more robust, since the touch-interface layer may protect other layers of the device.

In a further implementation form of the first aspect, the device further comprises a carrier structure and at least one support element aligned with the at least one piezoelectric transducer, wherein the at least one piezoelectric transducer is supported by the carrier structure via the at least one support element. The device may, for example, transfer the haptic effect more efficiently to the touch-interface surface.

In a further implementation form of the first aspect, the at least one support element comprises an adhesive. The device may, for example, be manufactured more efficiently.

In a further implementation form of the first aspect, the carrier structure comprises at least one protrusion on a side facing the PCB layer aligned with the at least one support element. The device may, for example, be more robust, since the protrusion may prevent over-bending of the piezoelectric element.

In a further implementation form of the first aspect, the substrate layer comprises conductive traces and electronic components coupled to the conductive traces, and the PCB layer comprises conductive traces electrically coupled to the conductive traces of the substrate layer. The device may, for example, be thinner since electronic components can be placed onto the substrate layer and signals to/from the piezoelectric transducer can be routed via the PCB layer.

In a further implementation form of the first aspect, the base plate and/or the piezoelectric element of the at least one piezoelectric transducer is electrically coupled to the PCB layer via a conductive adhesive element. The device may, for example, be thinner since signals to/from the piezoelectric element and the base plate can be routed via the PCB layer.

In a further implementation form of the first aspect, the conductive adhesive element comprises conductive glue. The device may, for example, be thinner since signals to/from the piezoelectric element and the base plate can be routed via the PCB layer.

In a further implementation form of the first aspect, the piezoelectric element of the at least one piezoelectric transducer is electrically coupled to the PCB layer via a soldered joint, the support plate of the at least one piezoelectric transducer is electrically coupled to the PCB layer via a soldered joint, and/or the PCB layer is electrically coupled to the substrate layer via a soldered joint. The device may, for example, be manufactured more efficiently, since the soldered joints may be manufactured using, for example, hot bar soldering.

In a further implementation form of the first aspect the base plate of the at least one piezoelectric transducer is electrically coupled to the substrate layer or to the PCB layer. The device may, for example, transfer signals to the base plate via the substrate layer or the PCB layer.

In a further implementation form of the first aspect, the second side of the substrate layer comprises at least one electrical contact and wherein the base plate of the at least one piezoelectric transducer is electrically coupled to the at least one electrical contact. The device may, for example, transfer signals to the base plate via the substrate layer.

In a further implementation form of the first aspect, the substrate layer comprises a capacitive touch detection layer. The device may, for example, detect touch on the touch-interface surface using the capacitive touch-detection layer.

In a further implementation form of the first aspect, the device further comprises a second PCB layer on the second side of the touch-interface layer and on the first side of the substrate layer. The device may, for example, be thinner since electronic components may be attached to the second PCB layer.

In a further implementation form of the first aspect, the second side of the substrate layer comprises an electrical connector for electrically coupling the device to a second device. The device may, for example, need only a single electrical connector.

It is to be understood that the implementation forms of the first aspect described above may be used in combination with each other. Several of the implementation forms may be combined together to form a further implementation form.

According to a second aspect, a trackpad comprises the device according to the first aspect.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
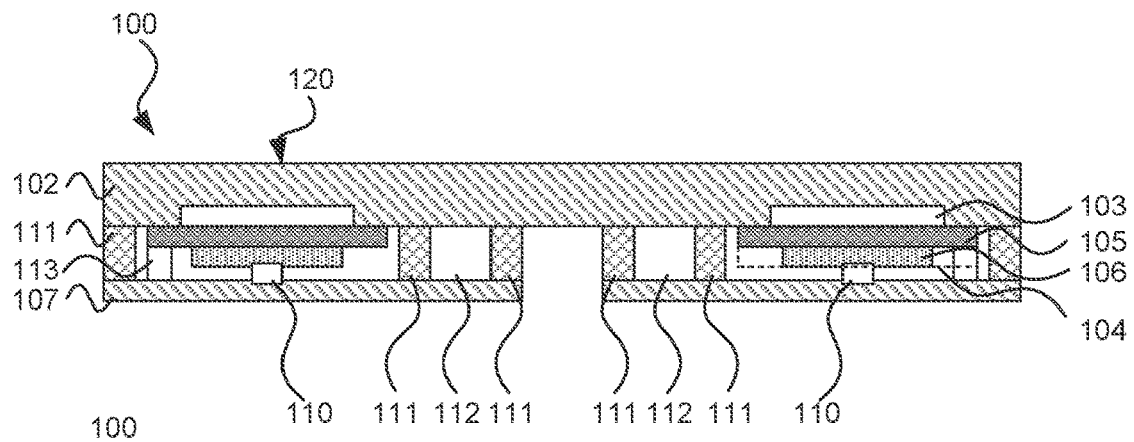
FIG. 1 illustrates a cross-sectional representation of a device according to an embodiment.

FIG. 1 illustrates cross-sectional representation of a device 100 according to an embodiment.

The device 100 may also be referred to as device for providing haptic effect, a device for providing haptic feedback, or similar.

Herein, a side of a layer may also be referred to as a face or as a surface of the layer. For example, a first side of a layer may also be referred to as a first face or as a first surface of the layer etc.

Herein, when referring to a first side and a second side of a layer, the first side may be opposite to the second side.

The cross-sectional geometry and/or dimensions presented in the embodiments herein are only exemplary and may not reflect actual geometry and/or dimensions of the parts/layers/components presented. A thickness of a layer may be less than one millimeter while lateral dimension of a layer may be multiple centimetres. Thus, for clarity of presentation, the dimensions are typically not to scale.

The device 100 may comprise a substrate layer 102 having a first side and a second side. The second side of the substrate layer 102 may comprise at least one depression 103.

A depression may refer to a section on the surface of the substrate layer 102 that is recessed compared to the rest of the surface.

The depression 103 may also be referred to as a cavity, an indentation, a recess, a pit, or similar.

The substrate layer 102 may also be referred to as a printed circuit board (PCB), a PCB layer, a printed circuit board assembly (PCBA), a PCBA layer, or similar.

The substrate layer 102 may comprise, for example, a dielectric composite material. The composites may comprise a matrix, such as an epoxy resin, and a reinforcement, such as a woven, sometimes nonwoven, glass fibres. A filler may be added to the resin.

A thickness of the substrate layer 102 may be, for example, in the range 0.1-2 mm or in any subrange of this, such as 0.2-1 mm, 0.4-1 mm, or 0.5-0.8 mm.

A depth of the depression 103 may be, for example, in the range 10-1000 micrometres (μm) or in any subrange of this, such as 10-500 μm, 10-200 μm, or 200-500 μm.

The device 100 may further comprise a touch-interface surface 120 on the first side of the substrate layer 102.

The touch-interface surface 120 may be at least partially unobstructed. A user may touch the unobstructed part of the touch-interface surface 120 and the device 100 may detect the touches and/or provide a haptic effect/feedback for the user via the touch-interface surface 120.

In a typical usage scenario of the device 100, the touch-interface surface 120 may be facing up. This may be the case, for example, when the device 100 is embodiment in a laptop trackpad.

The touch-interface surface 120 may correspond to, for example, the first side of the substrate layer 102. An example of this is illustrated in the embodiment of FIG. 1. Alternatively, the device 100 may comprise one or more layers on the first side of the substrate layer 102 and the touch-interface surface 120 may correspond to a surface of such a layer.

The touch-interface surface 120 may also be referred to as a touch interface, a touch surface, or similar.

The substrate layer 102 may comprise a capacitive touch detection layer. The capacitive touch detection layer may be configured to detect touch on the touch-interface surface 120.

The device 100 may further comprise at least one piezoelectric transducer 104 on the second side of the substrate layer 102 comprising a support plate 105 and a piezoelectric element 106. The at least one piezoelectric transducer 104 may be aligned with the at least one depression 103 of the substrate layer 102.

The support plate 105 may be mechanically coupled to the second side of the substrate layer 102. The support plate 105 may be in contact with the second side of the substrate layer 102. The support plate 105 may, for example, cover the at least one depression 103.

The support plate 105 may comprise a conductive material. The support plate 105 may comprise, for example, metal, such as copper and/or zinc, or a metal alloy, such as brass, steel, or stainless steel.

The piezoelectric element 106 may comprise a piezoelectric material. When a voltage is applied over the piezoelectric element 106, a strain may be induced into the piezoelectric element 106. Thus, by applying a voltage between the base plate 105 and the opposing side of the piezoelectric element 106, a haptic effect can be produced.

The piezoelectric element 106 may be adhered to the support plate 105 via an adhesive and/or glue.

The at least one piezoelectric transducer 104 may further comprise an electrode on the piezoelectric element 106. The piezoelectric element 106 may be electrically coupled to other elements of the device 100 via the electrode. The electrode may comprise, for example, screen-printed silver or other conductive material.

The at least one piezoelectric transducer 104 may also be referred to as a haptic element, a haptic feedback element, a tactile feedback element, a piezo actuator, a piezoelectric actuator, or similar.

Although the at least one piezoelectric transducer 104 may be configured to provide a haptic effect when a voltage is applied over the piezoelectric element 106, the at least one piezoelectric transducer 104 may also be used to detect touch on, for example, the touch-interface surface 120. When a force is applied to the touch-interface surface 120, a stress can be induced into the piezoelectric element 106, and the stress can induce a voltage over the piezoelectric element 106. This voltage may be detected.

If the substrate layer 102 comprises the capacitive touch detection layer, both the capacitive touch detection layer and the at least one piezoelectric transducer 104 may be used to detect touch. Furthermore, the at least one piezoelectric transducer 104 may be used to detect magnitude of the force applied to the touch-interface surface 120. Thus, a user may use both the location of touch and the magnitude of the applied force to control the device 100 and/or an apparatus the device 100 is embodied in.

Herein, when two components are aligned, this may indicate that the components are aligned with each other in the plane the relevant layer. Thus, the components are aligned when viewed from the first side or from the second side. The components may also be referred to as overlapping or as at least partially overlapping.

The support plate 105 may be in contact with the edges of the depression 103. Thus, the central area of the support plate 105 may bend into the depression 103 as the haptic actuator 104 provides the haptic effect. The depth of the depression 103 may be configured to stop overbending of the piezoelectric element 106.

A thickness of the at least one piezoelectric transducer 104 may be, for example, in the range 100 micrometres (μm)-1 mm or in any subrange of this, such as 100-800 μm, 100-500 μm, or 100-300 μm.

The device 100 may further comprise a printed circuit board (PCB) layer 107 electrically coupled to the piezoelectric element 106 of the at least one piezoelectric transducer 104.

The PCB layer 107 may comprise, for example, a flex-circuit layer, a flexible printed circuit (FPC) layer, a conductive foil layer, or a printed electronics layer.

The PCB layer 107 may also be electrically coupled to the base plate 105 of the at least one piezoelectric transducer 104.

The base plate 105 and/or the piezoelectric element 106 of the at least one piezoelectric transducer 104 may be electrically coupled to the PCB layer 107 via a conductive adhesive element 110.

The PCB layer 107 may comprise conductive traces. The base plate 105 and/or the piezoelectric element 106 of the at least one piezoelectric transducer 104 may be electrically coupled to the conductive traces of the PCB layer 107 via a conductive adhesive element 113.

The conductive adhesive element 110, 113 may comprise conductive adhesive tape, such as anisotropic conductive film (ACF) and/or conductive glue, such as silver glue. Conductive glue may also be referred to as electrically conductive glue.

A thickness of the conductive adhesive element 110 may be in the range 10-500 μm or in any subrange of this, such as 10-300 μm, 20-200 μm, or 100-300 μm.

A diameter of the conductive adhesive element 110 may be in the range 1-100 mm or in any subrange of this, such as 1-50 mm, 2-20 mm, or 1-10 mm.

The PCB layer 107 may also be referred to as a flexible printed circuit (FPC), an FPC layer, a flexible circuit layer, or similar.

The PCB layer 107 may comprise, for example, a flexible plastic substrate, such as polyimide, polyether ether ketone, or transparent conductive polyester.

The PCB layer 107 may comprise conductive traces. The conductive traces may be electrically coupled to the piezoelectric element 106 and/or to the base plate 105 of the at least one piezoelectric transducer 104. Thus, the PCB layer 107 may carry electrical signals for driving the at least one piezoelectric transducer 104 and/or signals from the at least one piezoelectric transducer 104 for detecting touch.

A thickness of the PCB layer 107 may be in the range 10-500 μm or in any subrange of this, such as 10-300 μm, 50-300 μm, or 50-200 μm.

Herein, a layer may refer to a structure having its lateral dimensions substantially larger than its thickness. In that sense, a layer may be considered as being a thin structure.

The device 100 may further comprise an adhesive layer 111 between the substrate layer 102 and the PCB layer 107. The adhesive layer 111 may not be a uniform layer. Instead, as illustrated for example in the embodiment of FIG. 1, the adhesive layer 111 may only be presented in some areas between the substrate layer 102 and the PCB layer 107.

The substrate layer 102 may be electrically coupled to the PCB layer 107 via an electrical connection 112. The electrical connection 112 may comprise, for example, an anisotropic conductive film (ACF) connector or a soldered joint. The soldered joint may be manufactured using, for example, hot bar soldering.

The piezoelectric element 106 of the at least one piezoelectric transducer 104 may be electrically coupled to the PCB layer 107 via a soldered joint.

The support plate 105 of the at least one piezoelectric transducer 104 may be electrically coupled to the PCB layer 107 via a soldered joint.

The PCB layer 107 may be electrically coupled to the substrate layer 102 via a soldered joint.

The soldered joints disclosed herein may be manufactured using, for example, soldering or reflow soldering.

It should be appreciated that some reference numbers have been omitted from FIG. 1 and other figures for clarity purposes. For example, although two piezoelectric transducer 104 are illustrated in the embodiment of FIG. 1, a reference number is only provided for one of the two piezoelectric transducers 104.

Figure 2:
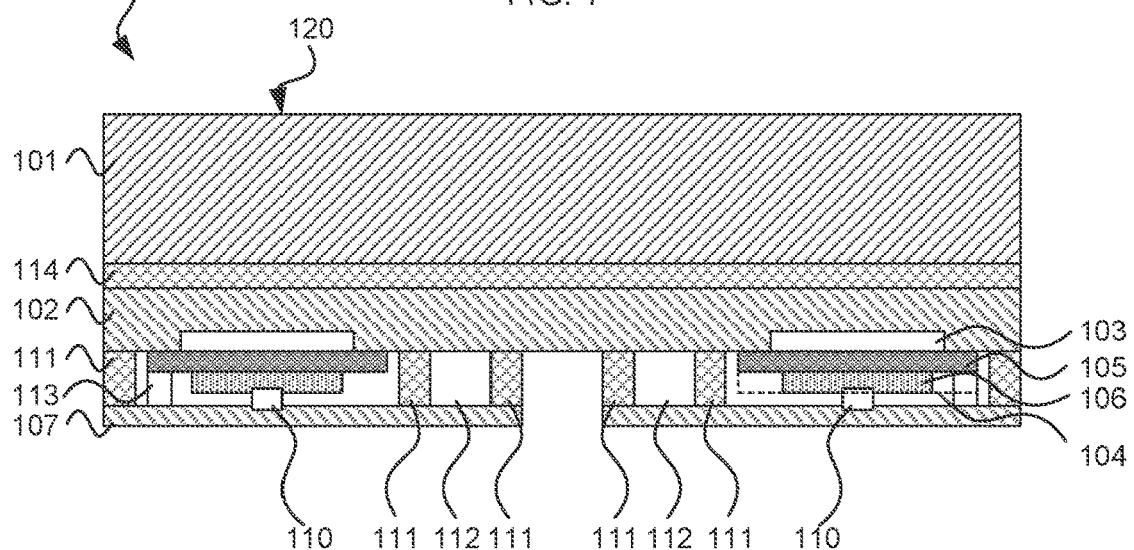
FIG. 2 illustrates a cross-sectional representation of a device further comprising a touch-interface layer according to an embodiment.

FIG. 2 illustrates a cross-sectional representation of a device further comprising a touch-interface layer 101 according to an embodiment.

According to an embodiment, the device 100 comprises a touch-interface layer 101 having a first side and a second side. The substrate layer 102 may be positioned on the second side of the touch-interface layer 101 and the first side of the substrate layer 102 may face the touch-interface layer 101. The touch interface surface 120 may be on the first side of the touch-interface layer 101.

The touch-interface surface 120 may correspond to the first side of the touch-interface layer 101.

The touch-interface layer 101 may comprise, for example, glass or plastic.

One side of the touch-interface layer 101 may be at least partially unobstructed. The second side of the touch-interface layer 101 may be facing a substrate layer 102 and the first side of the touch-interface layer 101 may be at least partially unobstructed. A user may touch the unobstructed part of the touch-interface layer 101 and the device 100 may detect the touches and/or provide a haptic effect/feedback for the user via the touch-interface layer 101.

In a typical usage scenario of the device 100, the first side of the touch-interface layer 101 may be facing up and the second side of the touch-interface layer 101 may be facing down. This may be the case, for example, when the device 100 is embodiment in a laptop trackpad.

The touch-interface layer 101 may also be referred to as a top layer, a touch layer, or similar.

A thickness of the touch-interface layer 101 may be, for example, in the range 0.1 millimetres (mm) to 3 mm or in any subrange of this, such as 0.2-2 mm, 0.3-1 mm, or 0.3-0.7 mm.

The device 100 may further comprise an adhesive layer 114 between the touch-interface layer 101 and the substrate layer 102. The adhesive layer 114 may be on the second side of the touch-interface layer 101 and on the first side of the substrate layer 102. A thickness of the adhesive layer 114 may be, for example, in the range 10-200 μm or in any subrange of this, such as 10-100 μm, 20-100 μm, or 30-80 μm.

Figure 3:
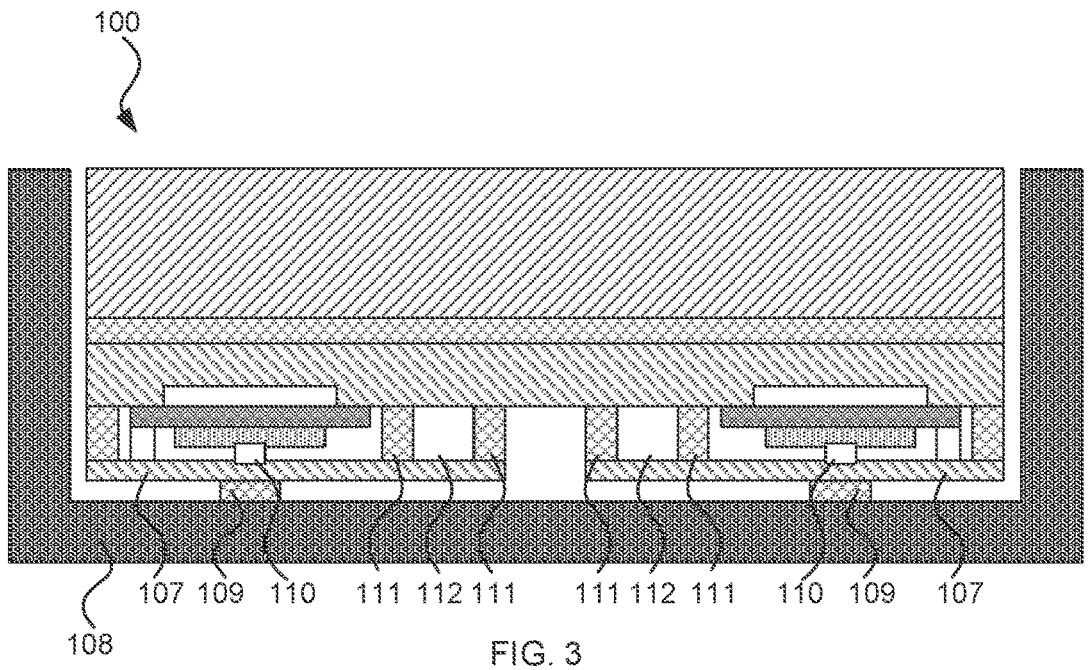
FIG. 3 illustrates a cross-sectional representation of a device further comprising a carrier structure according to an embodiment.

FIG. 3 illustrates a cross-sectional representation of a device 100 further comprising a carrier structure 108 according to an embodiment.

According to an embodiment, the device 100 further comprises a carrier structure 108 and at least one support element 109 aligned with the at least one piezoelectric transducer 104. The at least one piezoelectric transducer 104 may be supported by the carrier structure 108 via the at least one support element 109.

The carrier structure 108 may comprise, for example, a so-called C-cover of a laptop computer. A C-cover may refer to the surface/face of the laptop which holds a trackpad and a keyboard.

The carrier structure 108 may be mechanically coupled to the piezoelectric element 106 of the at least one piezoelectric transducer 104 via the at least one support element 109.

The carrier structure 108 may support the piezoelectric element 106 of the at least one piezoelectric transducer 104 via the at least one support element 109.

The PCB layer 107 may have a first side and a second side. The at least one piezoelectric transducer may be on the first side of the PCB layer 107. The at least one support element 109 may be on the second side of the PCB layer 107. The at least one support element 109 may be on the second side of the PCB layer 107. The carrier structure 108 may be on the second side of the PCB layer 107.

A thickness of the at least one support element 109 may be in the range 10 μm-5 mm or in any subrange of this, such as 10 μm-2 mm, 50 μm-1 mm, or 100 300 μm.

A diameter of the at least one support element 109 may be in the range 1-100 mm or in any subrange of this, such as 1-50 mm, 2-20 mm, or 1-10 mm.

Such a structure may be referred to as a "floating" structure. An example of a floating structure is illustrated in the embodiment of FIG. 3. Since the at least one piezoelectric transducer 104 is supported via the at least one support element 109, transfer of the haptic effect from the piezoelectric transducer 104 to the touch-interface surface 120 may be improved.

The carrier structure 108 may be a layer structure or a substantially planar structure. Alternatively, the carrier structure 108 may be shaped as container into which other layers and components disclosed herein may be placed as illustrated in the embodiment of FIG. 3.

According to an embodiment, the at least one support element 109 comprises an adhesive. The at least one support element 109 may also be referred to as an adhesive dot, a stiffener, a support structure, or similar. Alternatively or additionally, the at least one support element 109 may comprise a rigid structure.

Figure 4:
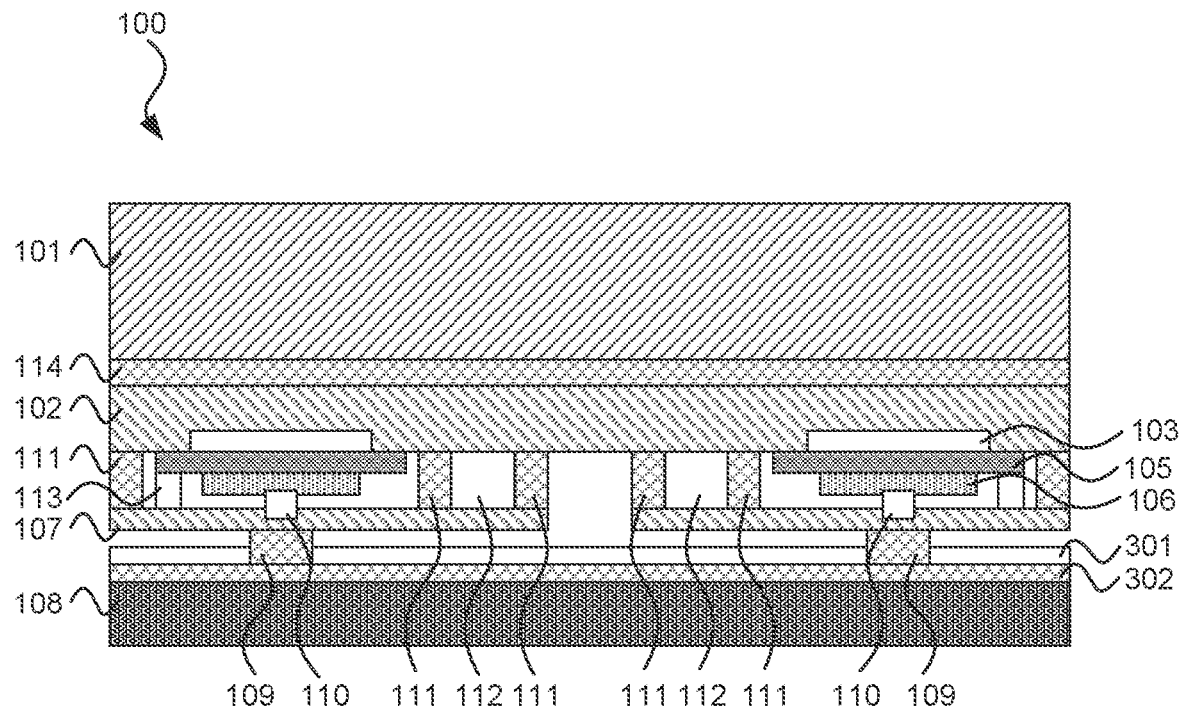
FIG. 4 illustrates a cross-sectional representation of a device further comprising an isolation layer according to an embodiment.

FIG. 4 illustrates a cross-sectional representation of a device 100 further comprising an isolation layer 301 according to an embodiment.

The device 100 may further comprise an isolation layer 301. The isolation layer may be positioned between the PCB layer 107 and the carrier structure 108. The device 100 may further comprise an adhesive layer 302 between the isolation layer 301 and the carrier structure 108.

If the at least one support element 109 is implemented as adhesive dots, separate adhesive dots could be troublesome to assemble onto the PCB layer 107. Thus, the adhesive dots may be assembled onto the carrier structure 108. The isolation layer 301 can then be one single part that includes the adhesive dots as a single module.

A thickness of the isolation layer 301 may be in the range 10-200 μm or in any subrange of this, such as 10-100 μm, 10-50 μm, or 20-50 μm.

A thickness of the adhesive layer 302 may be in the range 10-200 μm or in any subrange of this, such as 10-100 μm, 20-100 μm, or 30-80 μm.

Figure 5:
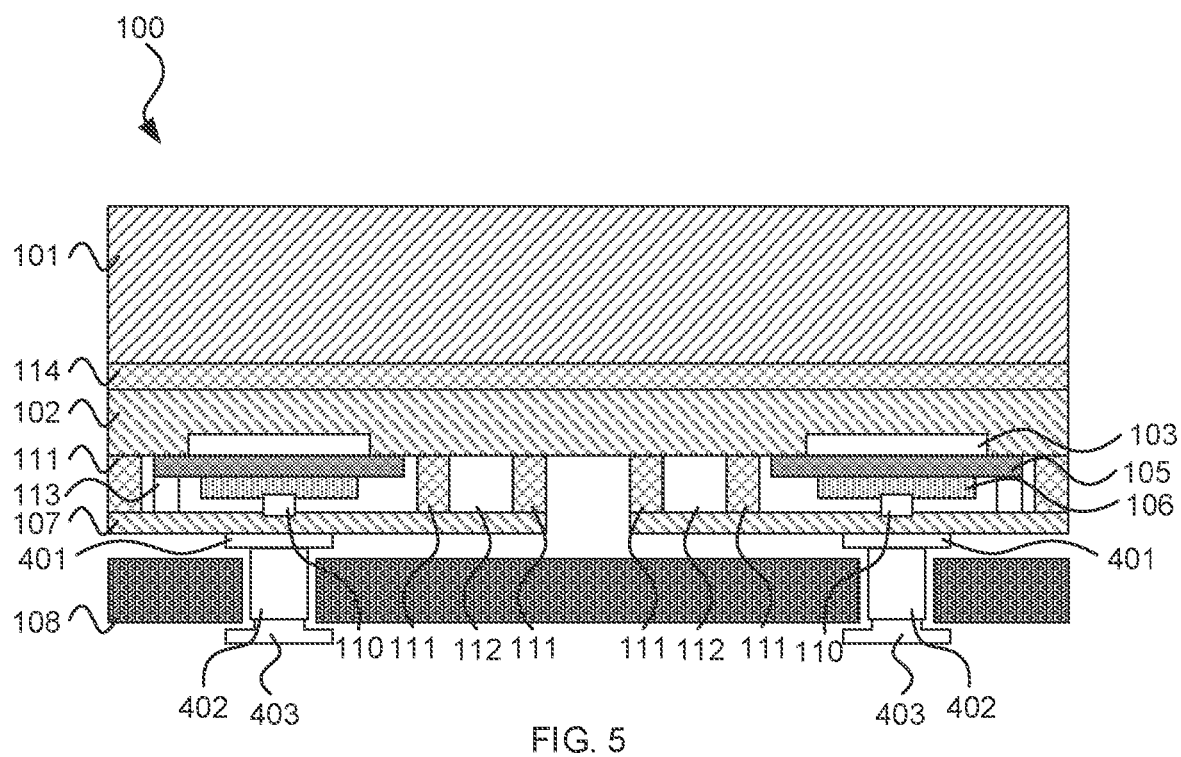
FIG. 5 illustrates a cross-sectional representation of a device further comprising a press-in nut according to an embodiment.

FIG. 5 illustrates a cross-sectional representation of a device 100 further comprising a press-in nut 402 according to an embodiment.

The PCB layer 107 may further comprise a sheet layer 401 and a press-in nut 402. A screw/bolt 403 may be screwed into the press-in nut 402 through the carrier structure 108. Thus, the layers of the device 100 may be easily attached to and detached from the carrier structure 108.

A thickness of the press-in nut 402 may be in the range 0.5-50 mm or in any subrange of this, such as 1-20 mm, 1-10 mm, or 1-5 mm.

A diameter of the press-in nut 402 may be in the range 1-50 m or in any subrange of this, such as 1-20 mm, 2-10 mm, or 2-7 mm.

Figure 6:
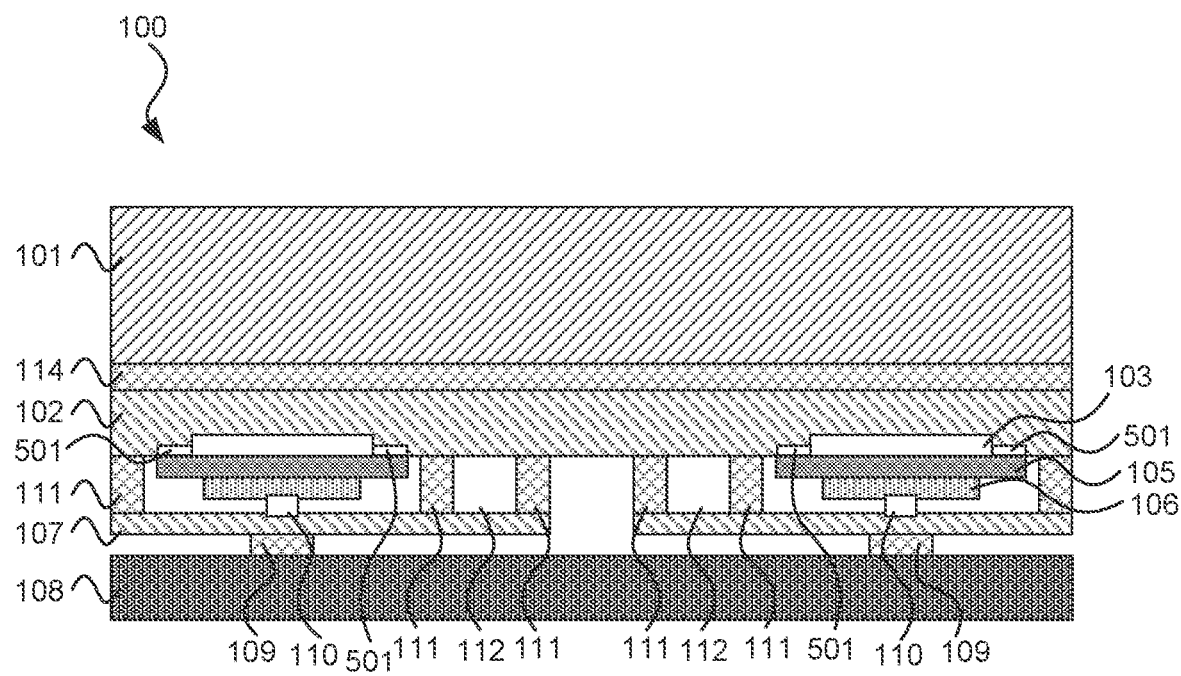
FIG. 6 illustrates a cross-sectional representation of a device further comprising an electric contact on the substrate layer according to an embodiment.

FIG. 6 illustrates a cross-sectional representation of a device 100 further comprising an electric contact 501 on the substrate layer 102 according to an embodiment.

The base plate 105 of the at least one piezoelectric transducer 104 may be electrically coupled to the substrate layer 102. This way, electric signals may be carrier to/from the base plate 105 via the substrate layer 102. The substrate layer 102 may comprise conductive traces for carrying the signals to/from the base plate 105. Thus, structure of the PCB layer 107 may be simplified.

The second side of the substrate layer 102 may comprise at least one electrical contact 501. The base plate 105 of the at least one piezoelectric transducer 104 may be electrically coupled to the at least one electrical contact 501. The substrate layer 102 may comprise conductive traces for carrying the signals to/from the base plate 105, and the conductive traces may be electrically coupled to the at least one electrical contact 501. The electrical contact 501 may comprise a contact pad.

Figure 7:
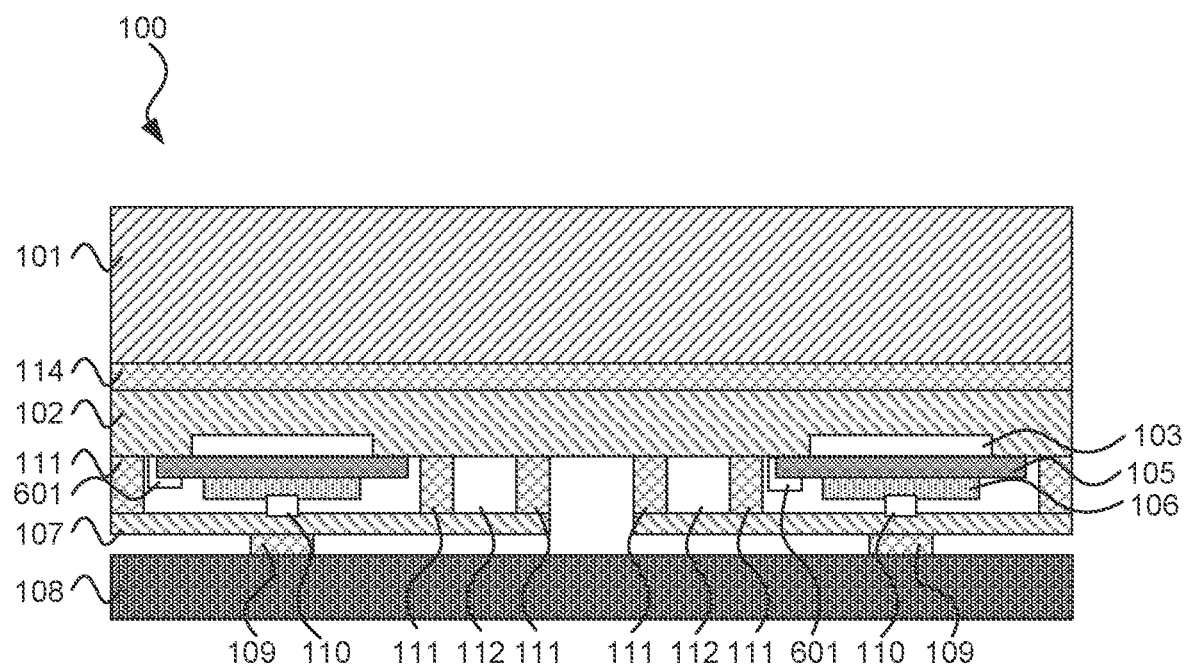
FIG. 7 illustrates a cross-sectional representation of a device wherein the base plate of the piezoelectric transducer is electrically coupled to the substrate layer according to an embodiment.

FIG. 7 illustrates a cross-sectional representation of a device 100 wherein the base plate 105 of the at least one piezoelectric transducer 104 is electrically coupled to the substrate layer 102 according to an embodiment.

The base plate 105 of the at least one piezoelectric transducer 104 may be electrically coupled to the substrate layer 102 via an electrical connection 601. The electrical connection 601 may comprise, for example, a conductive adhesive, such as silver glue, or a soldering joint. The soldering joint may be manufactured using, for example, hot bar soldering.

Figure 8:
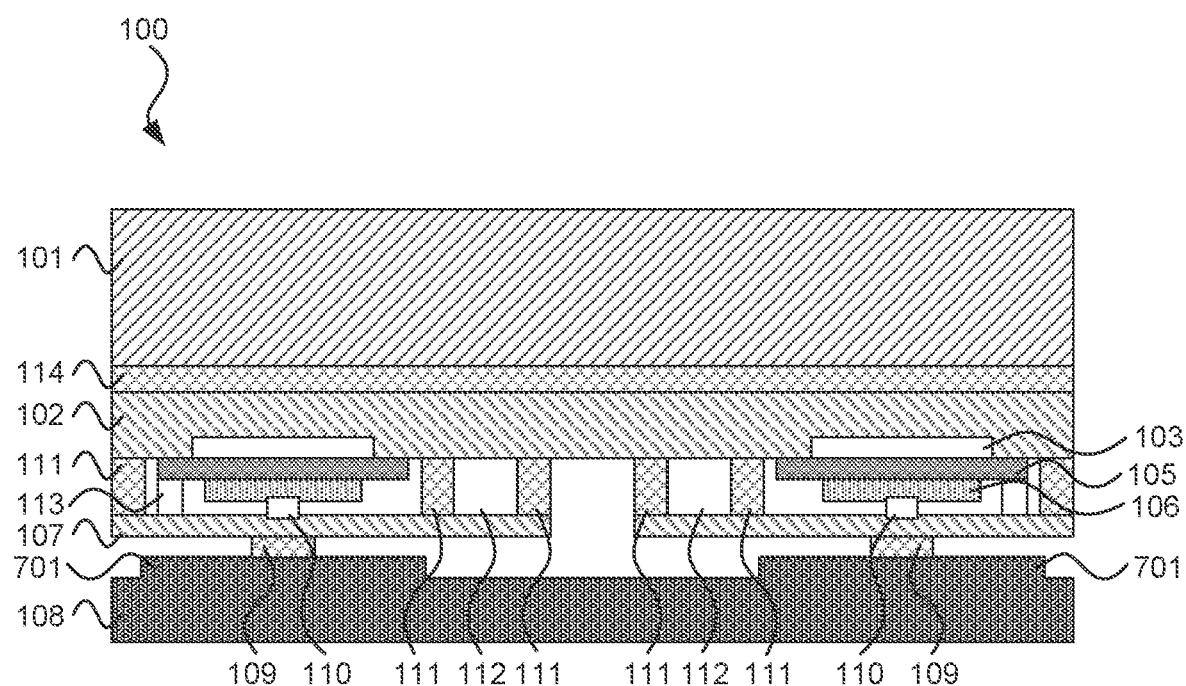
FIG. 8 illustrates a cross-sectional representation of a device wherein the carrier structure comprises a protrusion according to an embodiment.

FIG. 8 illustrates a cross-sectional representation of a device 100 wherein the carrier structure 108 comprises a protrusion 701 according to an embodiment.

The carrier structure 108 may comprise at least one protrusion 701 on a side facing the PCB layer 107 aligned with the at least one support element 109.

The protrusion 701 may also be referred to as a projection, a projecting element, a protruding element, or similar.

The at least one protrusion 701 may be manufactured by, for example, milling the carrier structure 108.

The at least one protrusion 701 may function as a so-called "front stop".

The at least one support element 109 may be relatively small and tall. Hence, if large force is applied to the touch-interface surface 101, the at least one support element 109 may deform the at least one piezoelectric transducer 104. The at least one support element 109 should have the necessary height to make sure that the PCB layer 107 does not touch the carrier structure 108 in a case where relatively large pressure force is used on a location between two or more support elements 109, as in such a case the whole stack could bend. Hence, enough height may be needed in areas between the piezoelectric transducers 104. The front stop can protect the stack from over-bending at the location of the at least one piezoelectric transducer 104 while at the same time enabling enough bending for whole stack at locations outside the at least one piezoelectric transducer 104. Hence, the at least one protrusion 701 may be similar in size or larger than the at least one piezoelectric transducer 104.

Figure 9:
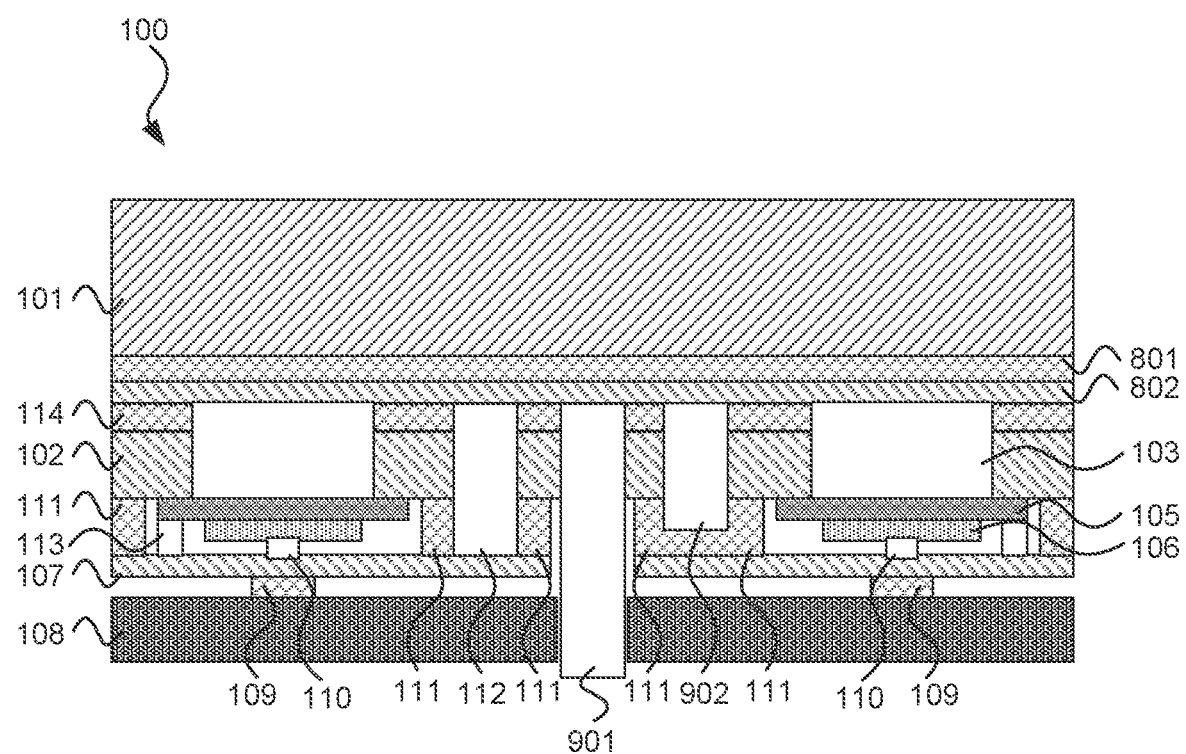
FIG. 9 illustrates a cross-sectional representation of a device further comprising a second PCB layer according to an embodiment.

FIG. 9 illustrates a cross-sectional representation of a device 100 further comprising a second PCB layer 802 according to an embodiment.

The device 100 may further comprise a second PCB layer 802 on the second side of the touch-interface layer 101 and on the first side of the substrate layer 102.

The second PCB layer 802 may comprise, for example, a flex-circuit layer, a flexible printed circuit (FPC) layer, a conductive foil layer, or a printed electronics layer.

The second PCB layer 802 may have a first side and a second side. The first side of the second PCB layer 802 may be facing the touch-interface layer 101. The second side of the second PCB layer 802 may be facing the substrate layer 102.

The device 100 may further comprise an adhesive layer 801 between the second PCB layer 802 and the touch-interface layer 101.

The second PCB layer 802 may comprise conductive traces electrically coupled to conductive traces of the substrate layer 102 and/or of the PCB layer 107.

The second PCB layer 802 may comprise electronic components 902. The electronic components 902 may be electrically coupled to the conductive traces in the second PCB layer 802.*h*

The electronic components 902 may be on the second side of the second PCB layer 802.

The substrate layer 102 and/or the PCB layer 107 may comprise through holes for the electronic components 902.

Since the electronic components 902 may have a predetermined height, how thin the device 100 may be limited by this height. As is illustrated in the embodiment of FIG. 9, by placing the electronic components 902 onto the second PCB layer 802, it may be possible to make the device 100 thinner.

The electronic components 902 may comprise, for example, an analogue front end (AFE), a system on chip (SoC), a field-programmable gate array (FPGA), a controller chip and/or other surface mount technology (SMT) components.

According to an embodiment, the second PCB layer 802 comprises an electrical connector 901 for electrically coupling the device 100 to a second device.

The electrical connector 901 may carry electrical signals to the second PCB layer 802 from outside the device 100 and signals from the second PCB layer 802 to outside the device 100.

Since the second PCB layer 802 may be electrically coupled to the substrate layer 102 and/or to the PCB layer 107, signals from and/or to the PCB layer 107/the substrate layer 102 can be carried by the electrical connector 901 via the second PCB layer 802.

The PCB layer 107, the adhesive layer 111, the substrate layer 102, the adhesive layer 114, and/or the carrier structure 108 may comprise a through-hole for the electrical connector 901.

Figure 10:
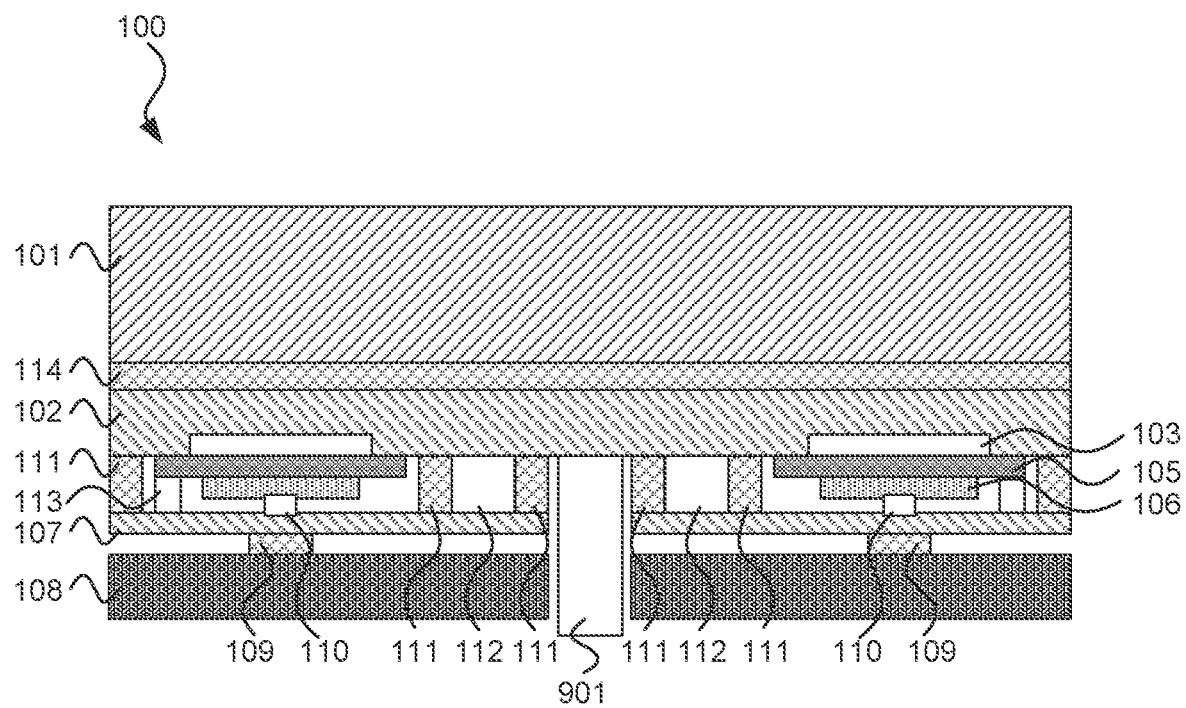
FIG. 10 illustrates a cross-sectional representation of a device further comprising an electrical connector according to an embodiment.

FIG. 10 illustrates a cross-sectional representation of a device 100 further comprising an electrical connector 901 according to an embodiment.

According to an embodiment, the second side of the substrate layer 101 comprises an electrical connector 901 for electrically coupling the device 100 to a second device.

The electrical connector 901 may carry electrical signals to the substrate layer 102 from outside the device 100 and signals from the substrate layer 102 to outside the device 100.

Since the PCB layer 107 may be electrically coupled to the substrate layer 102, signals from and/or to the PCB layer 107 can be carried by the electrical connector 901 via the substrate layer 102. Thus, only one electrical connector 901 may be needed to carry signals to/from components in the substrate layer 102 and in the PCB layer 107.

The PCB layer 107, the adhesive layer 111, and/or the carrier structure 108 may comprise a through-hole for the electrical connector 901.

Figure 11:
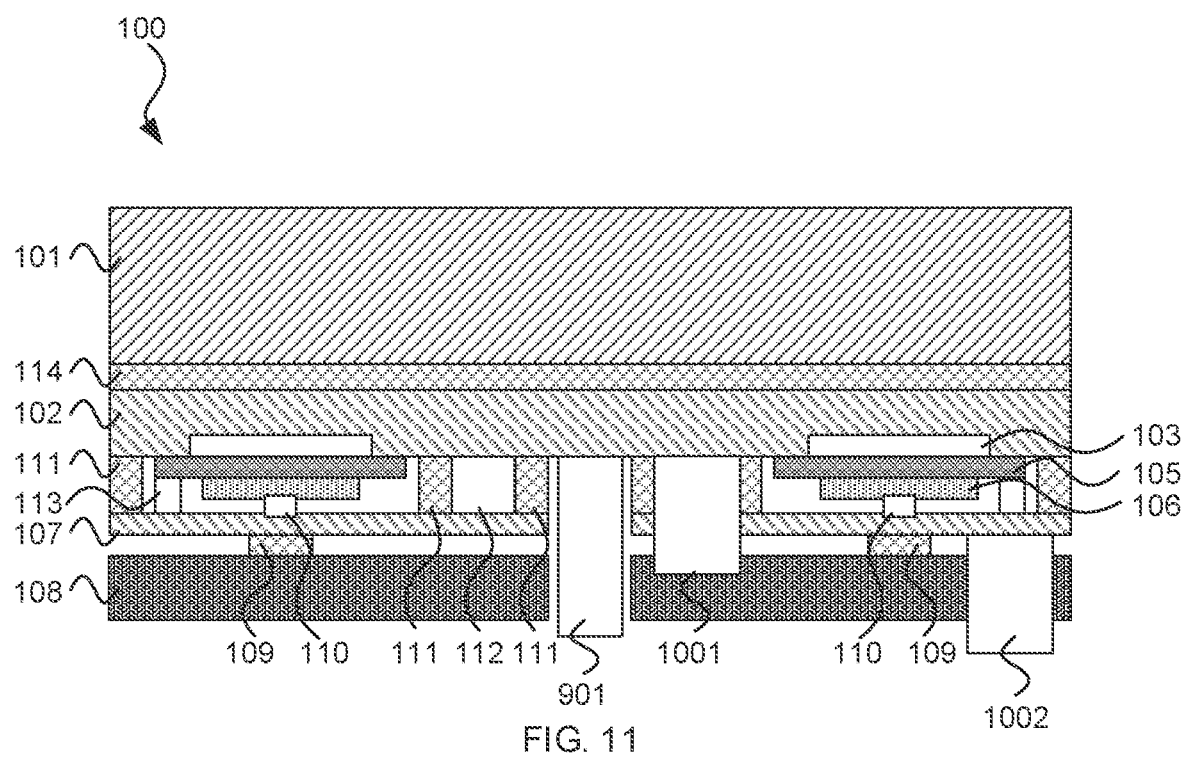
FIG. 11 illustrates a cross-sectional representation of a device further comprising electronic components according to an embodiment.

FIG. 11 illustrates a cross-sectional representation of a device 100 further comprising electronic components 1001, 1002 according to an embodiment.

The substrate layer 102 may comprise conductive traces and electronic components 1001 coupled to the conductive traces.

The PCB layer 107 may comprise conductive traces electrically coupled to the conductive traces of the substrate layer 102.

The conductive traces of the PCB layer 107 may be electrically coupled to the piezoelectric element 106 and/or to the base plate 105 of the at least one piezoelectric transducer 104.

The PCB layer 107 may comprise electronic components 1002. The electronic components 1002 may be electrically coupled to the conductive traces in the PCB layer 107.

The electronic components 1001, 1002 may comprise, for example, an analogue front end (AFE), a system on chip (SoC), a field-programmable gate array (FPGA), a controller chip and/or other surface mount technology (SMT) components.

Figure 12:
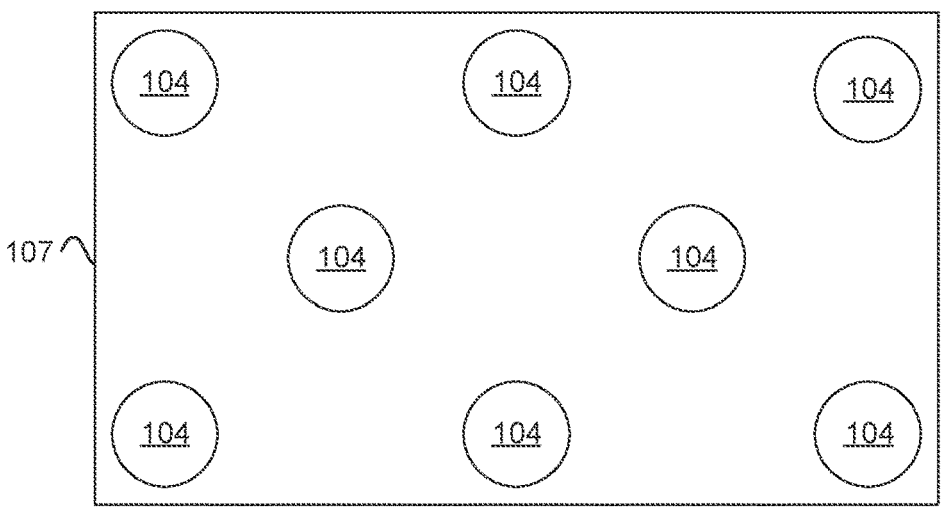
FIG. 12 illustrates schematic representation of a PCB layer according to an embodiment.

FIG. 12 illustrates schematic representation of a PCB layer 107 according to an embodiment.

The device 100 may comprise, for example, eight piezoelectric transducers 104 as illustrated in the embodiment of FIG. 12. The PCB layer 107 may comprise a uniform PCB as illustrated in the embodiment of FIG. 12.

Figure 13:
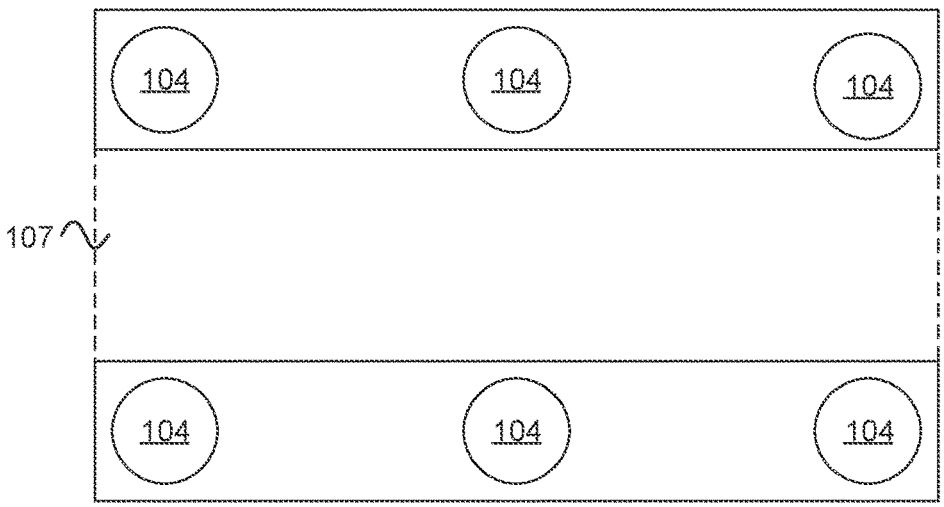
FIG. 13 illustrates schematic representation of a PCB layer according to another embodiment.

FIG. 13 illustrates schematic representation of a PCB layer 107 according to another embodiment.

The device 100 may comprise, for example, six piezoelectric transducers 104 as illustrated in the embodiment of FIG. 13.

The PCB layer 107 may comprise a non-uniform plurality of PCBs. For example, in the embodiment of FIG. 13, the PCB layer 107 comprises two PCBs and each PCB is electrically coupled to three piezoelectric transducers 104.

Using a lower number of piezoelectric transducers 104 may save costs in the manufacturing of the device 100, since a lower number of piezoelectric transducers 104 may be needed and less material may be needed for the PCB layer 107. This may also make the assembly of the device 100 easier.

Figure 14:
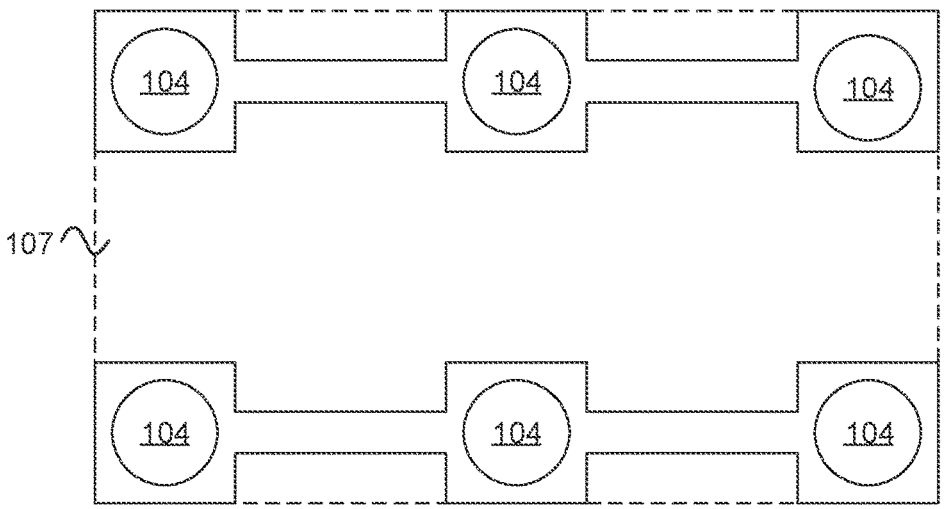
FIG. 14 illustrates schematic representation of a PCB layer according to another embodiment.

FIG. 14 illustrates schematic representation of a PCB layer 107 according to another embodiment.

Material costs may be reduced by shaping the PCB layer 107 in such a way that less material is needed. An example such a shape is illustrated in the embodiment of FIG. 14. This may also make the assembly of the device 100 easier.

Figure 15:
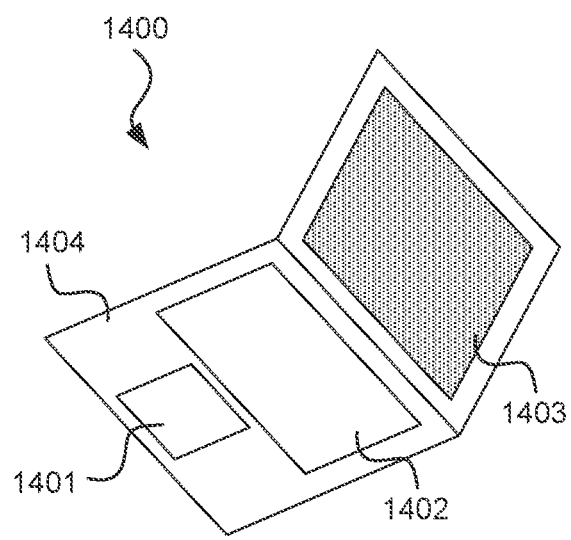
FIG. 15 illustrates a schematic representation of a laptop computer according to an embodiment.

FIG. 15 illustrates a schematic representation of a laptop computer 1400 according to an embodiment.

The laptop computer 1400 may comprise a trackpad 1401. The laptop computer 1400 may further comprise a keyboard 1402, a screen 1403, and a chassis 1404. The laptop computer 1400 may further comprise various other components not depicted in the embodiment of FIG. 15.

According to an embodiment, a trackpad 1401 comprises the device 100. The trackpad 1401 may also be referred to as a touchpad or similar. A user may operate the laptop computer 1400 using the trackpad 1401.

Figure 16:
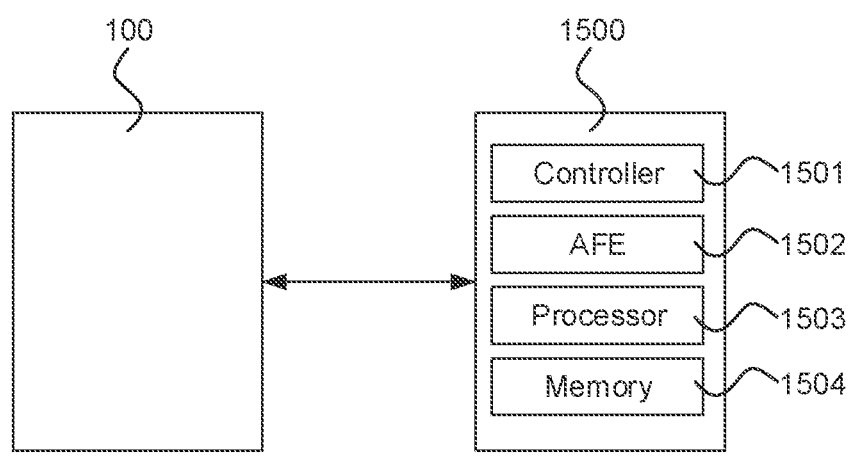
FIG. 16 illustrates a schematic representation of a connection between a device and a second device according to an embodiment.

FIG. 16 illustrates a schematic representation of a connection between the device 100 and a second device 1500 according to an embodiment.

The second device 1500 may correspond to, for example, the laptop computer 1400 of the embodiment presented in FIG. 15 or any other electronic device.

The second device 1500 may be electrically coupled to the device 100 via, for example, the connector 901.

The second device 1500 may comprise, for example, a controller 1501. The controller 1501 may control the device 100. The second device 1500 may further comprise an analogue front end (AFE). The second device 1500 may further comprise a processor 1503. The second device 1500 may further comprise a memory 1504. The processor 1503 may interface with the device 100 via, for example, the controller 1501 and/or the AFE 1502.

The memory 1504 may comprise program code, such as drivers, that cause the second device 1500 to interface with the device 100 when the program code is executed on the processor. Interfacing with the device 100 may comprise, for example, transmitting signals that cause the piezoelectric transducers in the device 100 to provide a haptic effect to the user and/or receiving signals from the device 100 that correspond to a user touching the touch-interface of the device 100.

Alternatively, some components, such as the controller 1501 and/or the AFE 1502 may be comprised in the device 100.

At least some embodiments disclosed herein may simplify the structure of the device 100 by incorporating different subassemblies into one. Surface mount technology (SMT) components may be incorporate into the substrate layer 102.

At least some embodiments disclosed herein may make the assembly of the device 100 less fragile during shipment and/or manufacturing.

At least some embodiments disclosed herein may make the device 100 thinner.

At least some embodiments disclosed herein may provide better touch sensitivity in the corners of the touch-interface surface 120 and/or a greater haptic effect. In traditional structures, when pressing in the corners of a trackpad, the structure may bend over the support element 109. In at least some embodiments, the force transfer to the piezoelectric transducers 104 may be improved.

At least some embodiments disclosed herein may reduce the number of connectors needed for the device 100. A separate connector may not be needed for the PCB layer 107, since the connectivity may be implemented via the substrate layer 102.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device for providing a haptic effect, comprising:
   a substrate layer having a first side and a second side, wherein the second side of the substrate layer comprises at least one depression;
   a touch-interface surface on the first side of the substrate layer;
   at least one piezoelectric transducer on the second side of the substrate layer comprising a support plate and a piezoelectric element, wherein the at least one piezoelectric transducer is aligned with the at least one depression of the substrate layer in a plane of the substrate layer; and
   a printed circuit board layer, later PCB layer, electrically coupled to the piezoelectric element of the piezoelectric transducer;
   wherein the support plate is in contact with the second side of the substrate layer and the piezoelectric element is located on a different side of the support plate than the substrate layer.

2. The device according to claim 1, further comprising a touch-interface layer having a first side and a second side, wherein the substrate layer is positioned on the second side of the touch-interface layer and the first side of the substrate layer faces the touch-interface layer and the touch interface surface is on the first side of the touch-interface layer.

3. The device according to claim 1, further comprising a carrier structure and at least one support element aligned with the at least one piezoelectric transducer, wherein the at least one piezoelectric transducer is supported by the carrier structure via the at least one support element.

4. The device according to claim 3, wherein the at least one support element comprises an adhesive.

5. The device according to claim 3, wherein the carrier structure comprises at least one protrusion on a side facing the PCB layer aligned with the at least one support element.

6. The device according to claim 1, wherein the substrate layer comprises conductive traces and electronic components coupled to the conductive traces, and wherein the PCB layer comprises conductive traces electrically coupled to the conductive traces of the substrate layer.

7. The device according to claim 1, wherein the support plate and/or the piezoelectric element of the at least one piezoelectric transducer is electrically coupled to the PCB layer via a conductive adhesive element.

8. The device according to claim 7, wherein the conductive adhesive element comprises conductive glue.

9. The device according to claim 1, wherein the piezoelectric element of the at least one piezoelectric transducer is electrically coupled to the PCB layer via a soldered joint, the support plate of the at least one piezoelectric transducer is electrically coupled to the PCB layer via a soldered joint, and/or the PCB layer is electrically coupled to the substrate layer via a soldered joint.

10. The device according to claim 1, wherein the support plate of the at least one piezoelectric transducer is electrically coupled to the substrate layer or to the PCB layer.

11. The device according to claim 1, wherein the second side of the substrate layer comprises at least one electrical contact and wherein the support plate of the at least one piezoelectric transducer is electrically coupled to the at least one electrical contact.

12. The device according to claim 1, wherein the substrate layer comprises a capacitive touch detection layer.

13. The device according to claim 2, further comprising a second PCB layer on the second side of the touch-interface layer and on the first side of the substrate layer.

14. The device according to claim 1, wherein the second side of the substrate layer comprises an electrical connector for electrically coupling the device to a second device.

15. A trackpad comprising a device for providing a haptic effect, wherein said device comprises:
   a substrate layer having a first side and a second side, wherein the second side of the substrate layer comprises at least one depression;
   a touch-interface surface on the first side of the substrate layer;
   at least one piezoelectric transducer on the second side of the substrate layer comprising a support plate and a piezoelectric element, wherein the at least one piezoelectric transducer is aligned with the at least one depression of the substrate layer in a plane of the substrate layer; and
   a printed circuit board layer, later PCB layer, electrically coupled to the piezoelectric element of the piezoelectric transducer;
   wherein the support plate is in contact with the second side of the substrate layer and the piezoelectric element is located on a different side of the support plate than the substrate layer.

* * * * *